United States Patent [19]

Tsuda et al.

[11] 3,997,193
[45] Dec. 14, 1976

[54] CONNECTOR FOR THE USE OF PIPES

[75] Inventors: Yoshikuni Tsuda; Osamu Onishi; Yasuo Mizohata; Ryozo Ota; Hiroshi Murakami, all of Sakai, Japan

[73] Assignee: Kubota Ltd., Osaka, Japan

[22] Filed: Dec. 9, 1974

[21] Appl. No.: 531,004

[30] Foreign Application Priority Data

| Dec. 10, 1973 | Japan | 48-140130 |
| Apr. 30, 1974 | Japan | 49-49163 |
| May 17, 1974 | Japan | 49-55955 |
| May 30, 1974 | Japan | 49-61555 |
| Mar. 29, 1974 | Japan | 49-36755[U] |
| May 30, 1974 | Japan | 49-62798[U] |

[52] U.S. Cl. ............................ 285/47; 29/523; 285/175; 285/226; 285/353; 285/382.4
[51] Int. Cl.² ........................................ F16L 11/12
[58] Field of Search ............ 285/258, 382.4, 382.5, 285/353, 222, 226, 47, 175; 29/507, 523

[56] References Cited

UNITED STATES PATENTS

| 1,525,758 | 2/1925 | Nicholls | 285/47 |
| 1,994,210 | 3/1935 | Chobert | 29/523 X |
| 2,092,358 | 9/1937 | Robertson | 285/382.4 X |
| 2,468,488 | 4/1949 | Coyle et al. | 29/523 X |
| 2,832,503 | 4/1958 | Boumann | 285/382 X |

FOREIGN PATENTS OR APPLICATIONS

| 1,552,227 | 11/1968 | France | 285/382.4 |
| 665,593 | 9/1938 | Germany | 285/222 |
| 589,587 | 6/1947 | United Kingdom | 285/258 |
| 217,859 | 6/1924 | United Kingdom | 285/222 |

*Primary Examiner*—Dave W. Arola
*Attorney, Agent, or Firm*—Frank J. Jordan

[57] ABSTRACT

In connecting a pipe with another pipe or another connector element, a cylindrical member is provided which is inserted into the end of the pipe. The cylindrical member has ring means thereon which are radially expanded in situ by an expanding tool which is inserted into the cylindrical member. As the ring means expands, the adjacent walls of the pipe are plastically deformed to form circumscribing grooves whereby the ring means are accommodated in the circumscribing grooves to thereby sealingly secure said cylindrical member to said pipe. The aforementioned securement may be effected while maintaining the integrity of any covering layer such as insulation or the like on the outside of the pipe.

7 Claims, 23 Drawing Figures

CONNECTOR FOR THE USE OF PIPES

BACKGROUND OF THE INVENTION

This invention relates to making a connection of pipes with each other, or in the case of making a connection of a pipe with another connecting section as a joint or the like, to making a connection thereof by the employment of a special connector. Conventional methods of making connections by welding are known, for example in Patent No. 1,199,072 of West Germany. In this example, a compression ring is set in place on around the outer circumferential wall of a cylinder at the connecting end of a pipe to cover the same and a cap is put on the compression ring for subjecting the same to collapsed deformation, to thus provide such a scarfed area wherein the compression ring and the cap nut are combined with each other in such a manner that proper compressive force is applied in the contact section thereof. The compression ring is subjected to collapsed deformation by way of the scarfed area, furthermore, the connecting end of the internal pipe is likewise subjected to collapsed deformation, while revolving the said cap nut, thus forming the compression ring and the connecting end of the pipe into an integral entity in terms of mechanical constitution. Such a means wherein the internal peripheral surface of the compression ring has a series of convex threads having a sharp-angled edge properly formed thereon, and the convex threads are engaged with the cylindrical external peripheral wall of the pipe at the connecting end thereof, for the purpose of improving watertightness. This technical idea is rather limited in the applicability thereof to such a thick metal pipe as is free from having the shape and the rigidity thereof deteriorated even in the case of being subjected to collapsed deformation, due to the principal construction thereof wherein collapsed deformation is caused to take shape at the connecting end of the pipe.

As the demand for such pipes have increasing emphasis placed on the preservation in heat of a substance to be transferred by means of a pipeline, wherefrom such composite pipes are given a coat of a diabatic layer of hardened expanded vinyl chloride or the like are being manufactured in a large quantity; however, now that the pipes of this category actually in use are thin metal pipes, the above-mentioned connector designed with collapsed deformation taken as the basic idea therefor cannot be expected to be sufficient in terms of mechanical connecting force, and the connection by means of such a connector is prone to be subjected either to disconnection or to deformation in the shape thereof due to bending force and, hence is unstabilzed. To put it otherwise, it is anything but desirable in engineering terms to subject a thin metal pipe to collapsed deformation.

With such a situation duly taken in consideration, such a construction of a connector or a connecting section as is well capable of displaying thorough and necessary connecting force and has sufficient stability against external bending force ought to be developed for the use of thin metal pipes as well where to the conventional technology proves rather hard to be properly applied.

The purpose of the present invention lies in providing such a novel construction of a connector as makes use of diameter-extending plastic deformation capable of forming the internal wall of cylinder into a partially ring-shaped surface of the connecting end of a pipe, in leiu of making use of the conventional collapsed deformation.

Another purpose of the present invention lies in adding to this connector such a construction for fitting a packing member as displays superb airtightness well capable of manifesting the effect thereof to a gaseous matter, as well as to a liquid matter.

Besides, the present invention has such a merit that, when employed for a composite pipe made of a thin metal material and covered with a coat of hardened expanded vinyl chloride or the like on the external peripheral wall over the entire length thereof, and has a feature in that the applicable scope of the connector is properly extended in such a manner as to be generally employed for any thin pipe.

PRIOR ART

Figure 1A:
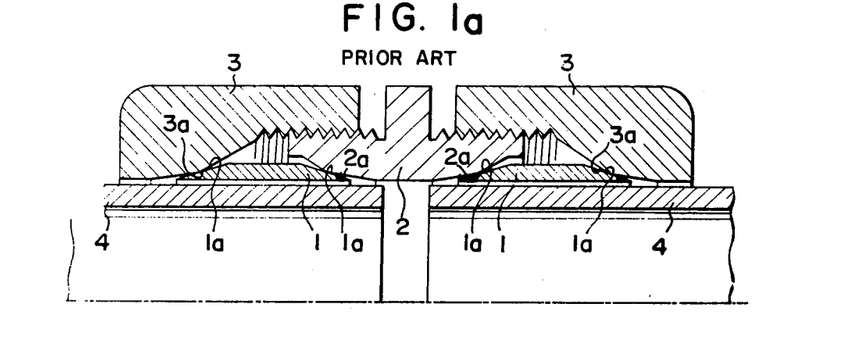
FIG. 1a is a partial section of a prior art connector.

The prior art contactor disclosed in Patent Publication No. 1,199,072 of West Germany and shown in FIG. 1a is of a construction wherein a compression ring 1 is properly set in place in such a manner as to cover the outer peripheral wall of a cylinder at the connecting end of a pipe 4, and the ring 1 is covered with a set of cap nuts 2, 3. The compression ring 1 has tapers 1a, 1a at both ends thereof, and the pair of cap nuts, 2, 3 confronted therewith also have tapers 2a, 3a respectively, and the compression ring 1 is subjected to collapsed deformation from outside by the engagement of the tapers with each other. Mechanical coupling is likewise effectuated between the compression ring and the connecting end of the pipe in the state of subjecting the pipe 4 more or less to collapsed deformation.

Figure 1B:
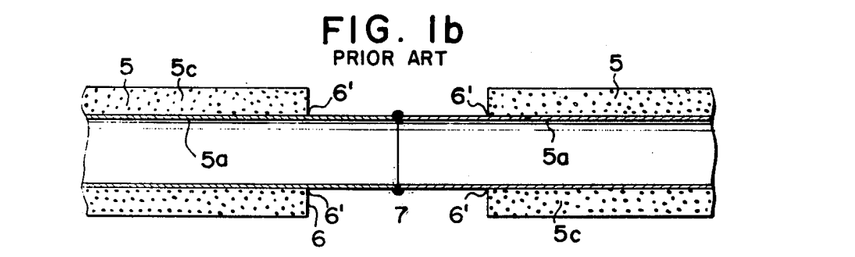
FIG. 1b and FIG. 1c are sections of a prior art composite pipe connected by welding.
Figure 1C:
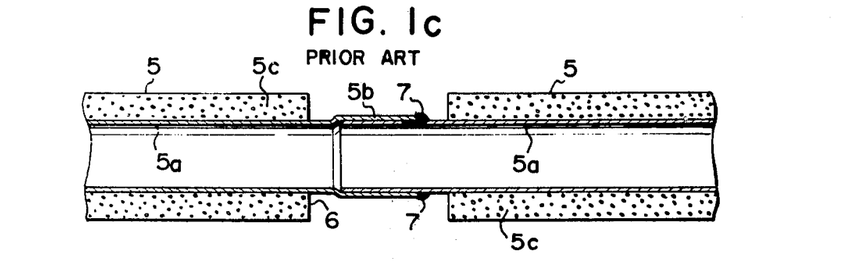

The connection of pipes with each other by welding shown in FIG. 1b and FIG. 1c is an example of connecting of composite pipes wherein thin metal pipes have an adiabatic layer of hardened expanded vinyl chloride properly covered thereon. Such a connecting device as is employed in the above-mentioned example proves difficult to be employed for thin metal pipes in that they are prone to lose their rigidity and shape due to collapsed deformation. Now that a composite pipe 5 of this category is given a coat or adiabatic layer 5c for the purpose of heat preservation as regards the substance to be transferred thereby, the adiabatic layer is subjected to exfoliation 6 at the connecting end in the course of connecting the pipes. The connecting end of such a thin pipe made of stainless steel or the like that has the adiabatic layer thus exfoliated is then subjected to welding 7. In the case of the example shown in FIG. 1c, the contact end of one pipe is subjected to expansion of the diameter thereof as indicated at 5b, and the contact end of the other pipe is set in place into the section and thus subjected to to the expanded diameter 5b. Thereafter welding 7 is effected for the purpose of ensuring the connection.

Adiabatic pipes made of metal or the like are subjected to heating or cooling by a heat transfer medium as in running therein, for instance, a heating medium like hot water, or a cooling medium like freon gas or the like; however, since the metal pipe and the heat insulating layer are considerably different from each other in terms of their thermal expansion coefficient, a lot of stress occurs on the interface between the metal pipe and the heat insulating layer. For this reason, the metal pipe and the heat insulating layer are interlocked with each other securely enough by the employment of a bonding agent or the like, to thus prevent abrasion from occuring as a result of such stress. Therefore, a quite troublesome operation is required for the exfoliation of the heat insulating layer off the end section of the heat insulation pipe, thereby resulting in quite an inefficient arrangement.

Meanwhile, now that, at the connecting end thus subjected to exfoliation, the metal pipe thus subjected to delivery and the insulated pipe are fairly different from each other in flexual rigidity, the flexual stress is prone to be concentrated in the metal pipe at position 6' at the end surface of the heat insulating layer.

the method for making connection of pipes, involving a process of exfoliating the cover of a heat insulating layer or the like ought to be avoided for the reason that the strength of the connecting section of pipes is often subjected to deterioration, as well as proves to be deficient in workability. In the case of such a connecting devide as makes use of collapsed deformation by the employment of a compression ring, proper connection of pipes can be conducted only when a heat insulation layer is subjected to a fairly troublesome process of exfoliation.

SUMMARY OF THE INVENTION

A connector according to in the present invention is well capable of effecting the connection of thin metal pipes and to have superb connecting forces while making use of the partial plastic deformation involved in metal pipes. To put it in more specific terms, in case the partial plastic deformation is caused to take shape at such a position as is spaced from the end of the metal pipe whereto no plastic deformation reaches, the rigidity of shape is kept free from being subjected to deterioration in terms of the shape of the connecting sections of pipes, and this finding has led to the present invention. Furthermore, the connector according to the present invention is properly made applicable extensively enough to metal pipes wherefor the employment of the conventional connector has been avoided thus far, simply enough by subjecting the internal peripheral wall of a metal pipe to outward expansion of the diameter thereof. Furthermore, in the case of such a composite pipe as has a covering layer incorporated therewith in a solid manner, this connector well proves to be capable of being fitted directly on the connecting end of a counterpart composite pipe, completely free from scraping the covering layer. The range of the clamping devices eligible for use in common with this connector is wide enough, and, a clamping device of the cap nut type, any one of a variety of clamping devices of the flange type, or the like, can be selected at liberty on the occasion of the use thereof for proper coupling, completely free from the trouble of coupling the same in advance. Besides, in the case of making a connection thereof by welding, superb welding can be executed readily enough.

Such partial plastic deformation as extends the diameter in a ring-shaped manner to an internal position whereby the deformation is kept free from being propagated from the connecting end of a pipe is less in the stress applied on the connecting end of the pipe than such ring-shaped plastic deformation scaled down as is properly taken as an object for making comparison therewith. The force required for extending the diameter may well be less than the force required for reducing the diameter, and the diameter-extending plastic deformation is free from the possibility of subjecting the connecting end of a pipe to a strain which would cause flattening, meanwhile, diameter-reducing deformation is prone to cause deformation in its shape. The finding of such a sharp concave shape being formed in this manner, for the fact that the partial diameter-extending plastic deformation to be extended outward like this forms a ring-shaped groove either at a sharp angle or into a terrace shape on the internal wall of the pipe, constitutes the basic feature of the connector according to the present invention. To put it otherwise, such a sharp concave shape as this draws out a dragging force to cope with the external drawing force as is required of the connecting section of a pipe, and displays sufficient drag likewise to cope with such an external force as is applied on the connecting section of the pipe to thus subject the pipe to flexure.

DETAILED DESCRIPTION OF THE INVENTION

Figure 2A:
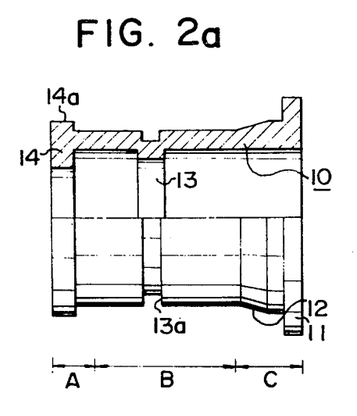
FIG. 2a and FIG. 2b are partial sections of two connectors according the present invention.

The connector according to the present invention and shown in FIG. 2a has the basic construction properly depicted in the form of a sectional drawing. A connector 10 comprises the following three sections: a top section A which is to be inserted into the inner portion of the connecting section of a pipe, an intermediate section B, and a rear section C which extends to the outside of the connecting end. The external diameter of the intermediate section B, as well as that of the top section A, is so selected as to be less than the inner diameter of the pipe, thus making it easy enough to be inserted into the inner section of the connecting section in a proper manner. The rear section C has such an inclination 12 as to enable the outer diameter of the the connecting end to increase in a gradual manner relative to the inner diameter, and has a flange 11 properly formed at the final stage. The top section A has a primary ejection ring section 14 properly formed thereon, has a secondary ejection ring 13 properly formed at virtually the center of the intermediate section B, and has the external periphery formed into a ring-shaped groove 13a. The external peripheral section 14a of the primary ejection ring section 14 constitutes a step which projects from the intermediate section B.

Figure 2B:
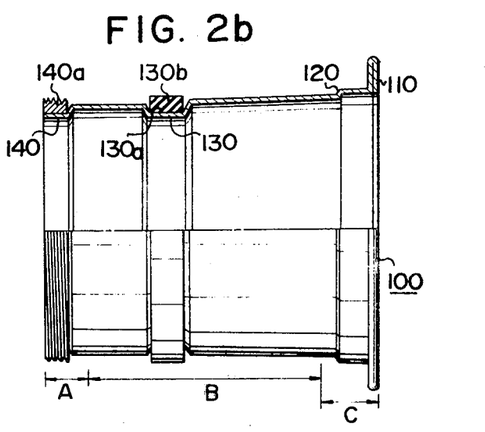
Figure 4A:
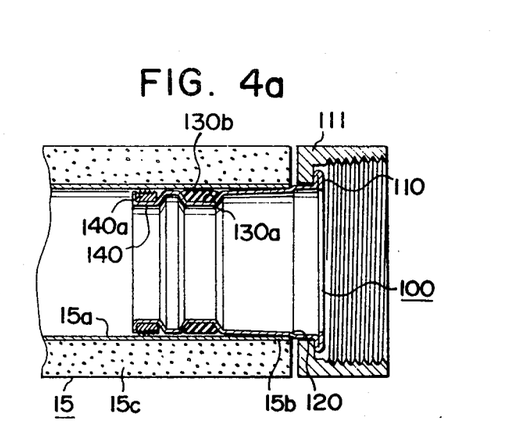
FIG. 4a and FIG. 4b are sections of the connector shown in FIG. 2b coupled with a cap nut and shown in the state thereof prior, and posterior, to being fitted in place on a composite pipe, respectively.

The section shown in FIG. 2b is a basic example of the connector made of a pipe member. The top section A has an ejection ring 140a properly fitted in place into such a ring-shaped flange 140 of a smaller diameter which steps down, whereby the primary ejection ring section 14 is thus properly formed. The intermediate section B has a ring-shaped concave section 130 properly formed at a position rather near the top section of the center thereof, and the external periphery has a packing member 130b like a rubber ring of the like properly fitted in place in a ring-shaped groove 130a which is formed thereon. The rear section C has a step 120 which is engaged with an open edge of the connecting end of the pipe properly formed thereon, and furthermore, has a flange 110 formed by bending the pipe. The intermediate section B is provided with a gentle slope which runs to the top section A from the step section 120. This state is discerned in the sectional drawing thereof in FIG. 2b and represents the condition at the time of being inserted into a heat insulation pipe as shown in FIG. 4a.

Figure 3A:
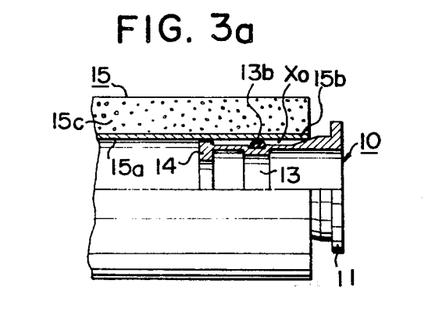
FIG. 3a through FIG. 3c are partial sections of the connector shown in FIG. 2a specifically prepared for disclosing a process of fitting the same on the connecting end of a composite pipe, respectively.
Figure 3B:
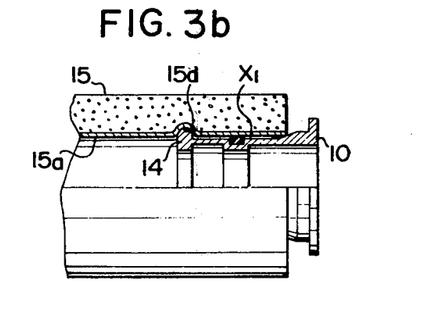
Figure 3C:
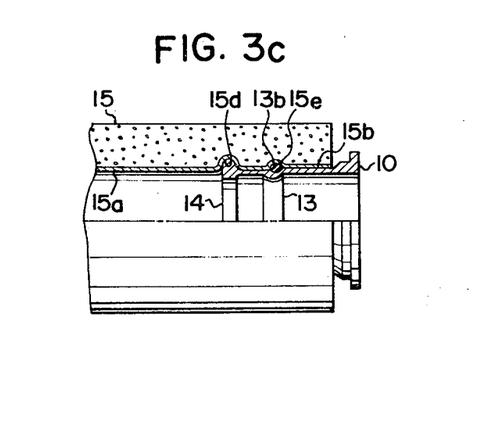
Figure 11:
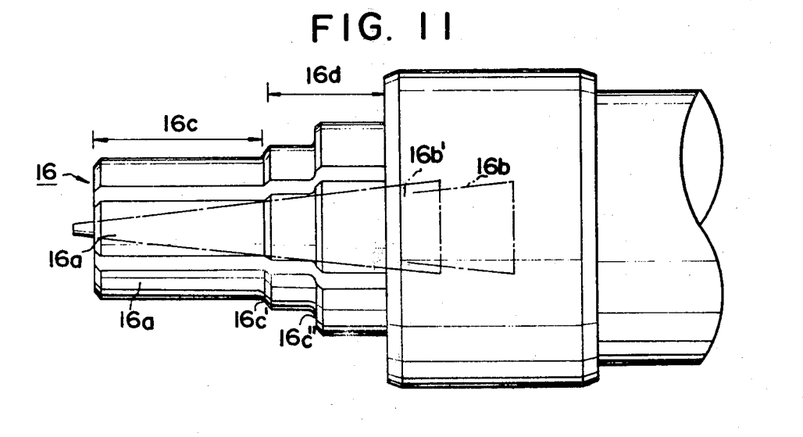
FIG. 11 shows the working head of an example of a diameter-extending device employed at the time of fitting the connector introduced in the present invention properly in place on the connecting end of a pipe.

The sequence of fitting the connector shown in FIG. 2 in place into a heat insulation pipe 15 is shown in FIG. 3a through FIG. 3c. The heat insulation pipe 15 has a heat insulation layer 15c made of hard vinyl chloride as is properly put on a thin stainless steel pipe 15a as a cover in a secure manner. A clearance $X_0$ is formed between the intermediate section B and the pipe-connecting end of the connector, and insertion into the connecting end of the connector can be conducted readily enough in such manner as is shown in FIG. 3a. The secondary ejection ring section 13 has a rubber ring 13b properly fitted in place into the external peripheral groove 13a thereof. FIG. 3b shows a state wherein only the primary ejection ring section 14 is subjected to the treatment for expanding the diameter. The inner diameter of the primary ejection ring section 14 is less than that of the secondary ejection ring section 13 and, the expansion of the diameter is conducted in such a sequence that the primary ejection ring section is first subjected to the expansion, and in the wake thereof the primary ejection ring section is further subjected to expansion concurrently with the expansion of the diameter of the secondary ejection ring section, in two steps. The tools required for expanding the diameter are shown in FIG. 11. The diameter build-up device 16 of which only the head is shown in FIG. 11 has split molds 16a, 16a properly incorporated therewith along the periphery of a conical member 16b and are caused to move forward and backward along the axial direction by virtue of hydraulic pressure, and also to expand and reduce in the axial direction on the inclined plane of the conical member 16b. 16b' represent a conical member as is set in place at the position whereto the member 16b moves forward to expand the split mold 16a. The peripheral section 16c of the split mold 16a functions in such a manner as to expand the diameters of the primary and secondary ejection ring sections 14, 13. Another peripheral section 16d is used for other diameter build-up deformation.

In the state shown in FIG. 3b, the outer peripheral section 14a of the primary ejection ring section 14 causes the thin metal pipe 15a to be subjected to a ring-shaped partial plastic deformation 15d. The clearance $X_0$ is changed into a smaller clearance $X_1$. The state shown in FIG. 3c occurs when the primary and secondary ejection ring sections 14, 13 are concurrently subjected to further diameter build-up, and the connector 10 is fitted in place completely into the pipe connecting end. The partial plastic deformation 15d becomes all the more deeply concave, to thus become a sharp-angled concave groove, and secure mechanical incorporation with the primary ejection ring section 14 is properly attained. The rubber ring 13b, for its part, too, causes the metal pipe 15a to be subjected to gentle plastic deformation outward, to thus produce the same superb sealing force. The sharp-angled partial plastic deformation 15d is superb in sealing function, and is well capable by itself of producing such sealing force as is normally required.

The connecting end 15b of the heat insulation pipe has the heat insulation layer 15c kept set intact as a cover over the outer periphery, without being subjected to scaling-off, as shown in the drawing. In case this heat insulation layer is as high in strength as hardened vinyl chloride, pressure adhesion force between the plastic deformation section 15d, 15e and the primary ejection ring section 14 or the rubber ring 13b increases, thus well claimable to have such advantages that not only a troublesome process of stripping of the heat insulation layer is saved but also secure connection can be obtained.

Figure 4B:
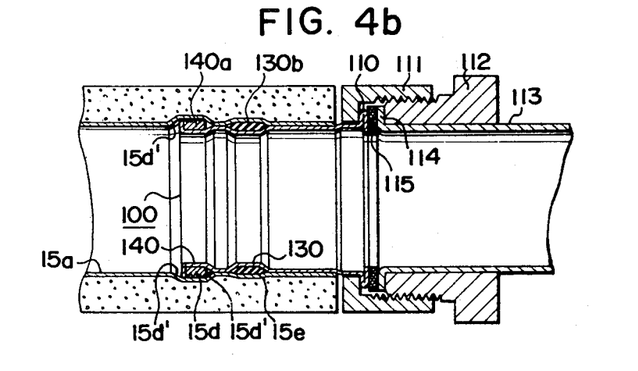

Shown in FIG. 4a and FIG. 4b is a connector 100 which is similar to that shown in FIG. 2b subject to slight modification, and which is shown in the state thereof prior to, and posterior to, being properly fitted in place, respectively. The flange 110 of the rear section C has a cap nut 111 properly supported thereon. The point thus subjected to modification is that a ring-shaped groove 130a is formed near the boundary between the intermediate section B and the top section A, and a ring-shaped flange 140 formed into the shape of a groove is properly fitted in place with an injection ring 140a of such a diameter as is not in excess of the outer diameter of the intermediate section B. The ejection ring 140a subjects the metal pipe 15a to sharply concaved plastic deformation 15d, and subjects the packing member 130b to gentle plastic deformation 15e, as set forth above; therefore, such a space which does not result in deformations and which is continuous is properly allowed between the ring-shaped flange 140 and the ring-shaped groove 130a. The said boundary is along the center of this space. In the case of expanding the diameter of the ring-shaped flange 140 by the employment of the diameter build-up tool 16, the ring-shaped flange 140 can be subjected to sufficiently large a plastic deformation in such a manner that the flexible section constituting the ring-shaped flange is opened; therefore, the metal pipe 15a can be subjected to plastic deformation at the sufficient height 15d', even in case the outer diameter of the ejection ring 140a is smaller than the outer diameter of the intermediate section B. As shown in FIG. 4b showing the state posterior to the diameter build-up treatment, sharp-angled ring-shaped plastic deformation 15d and gentle plastic deformation 15e take shape, whereby both are in pressure contact with the surface of the connector 100. Such other member as the cylinder 113 shown in FIG. 4b has a nut 112 properly fitted thereon, and, is subjected to diameter build-up by the employment of the diameter build-up tool 16 and by making use of the difference in level 16c' or 16c" between the peripheral section 16c and the peripheral section 16d of the split mold, thus forming a flange 114 in a proper manner. The flange 110 and this flange 114 have a packing member 115 properly held in place between, and the heat insulation pipe is connected with the cylinder 113 in a secure manner by clamping the cap nut 111 and the nut 112 with each other. The sharp-angled ring-shaped side section 15d' of the plastic deformation 15d exhibits a powerful engaging force.

When the connector 10 or 100 shown in FIG. 3a and FIG. 4a is completely fitted in place into the pipe connecting end, the inner diameter section of the primary ejection ring section 14 and that of the secondary ejection ring section 13 are so kept as to protrude by a bit over the internal peripheral wall of the metal pipe 15a, which, however, has virtually nothing to do with the transfer efficiency of the pipe. Likewise, the said state is virtually free from affecting the transfer efficiency, even in case the ring-shaped flange 140 and the ring-shaped concave groove 130 are in the state of slightly protruding over the inner peripheral wall of the pipe 15a.

Figure 5A:
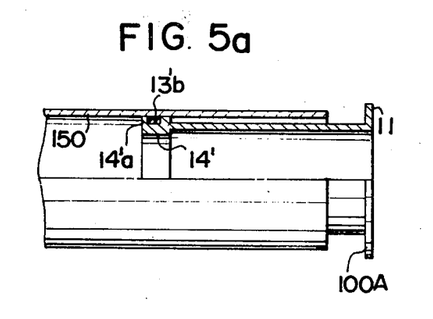
FIG. 5a is a section of a connector of an alternate embodiment in the state thereof prior to being fitted in place on a thin pipe.
Figure 5B:
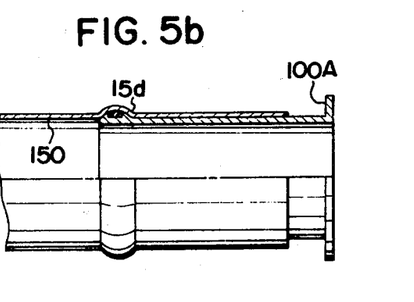
FIG. 5b is a section of the connector in FIG. 5a after being fitted in place.

Shown in FIG. 5a is an alternate embodiment wherein a primary ejection ring 14' has a ring-shaped groove properly formed on the outer peripheral section 14'a, and a modified connector 100A having a packing member 13'b properly fitted in place into the ring-shaped groove is inserted into the metal pipe 150. To put it otherwise, the intermediate section B has no ring-shaped concave section nor a secondary election ring section formed therein. The outer diameter of this intermediate section B is so selected as to be smaller than the inner diameter of the metal pipe 150, and the rear section C has a flange 11 properly formed therein. Shown in FIG. 5b is such a state wherein the connector 100A therefore is subjected to proper diameter build-up treatment and properly fitted in place by pressure expansion into the connecting end of the metal pipe. The partial ring-shaped plastic deformation 15d of the metal pipe 150 compresses the packing member, and is engaged with the primary ejection ring 14' in a secure manner, thus producing a mechanically integrated superb connection. This example is a case wherein the connector is applied to a conventional metal pipe having the external side thereof covered with no heat insulation layer at all, as shown in the drawing. Therefore, the connecting end of this metal surface has a convex section formed by the plastic deformation 15d and occurring on the outer peripheral surface thereof.

Figure 6:
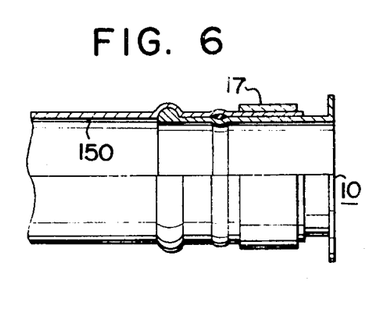
FIG. 6 is a section of another alternate embodiment showing the construction of a connecting section which employs an auxiliary connecting device to be coupled with the connector for the purpose of reinforcing the connecting end of a thin pipe.

Shown in FIG. 6 is another alternate embodiment wherein the connector is employed together with a supplementary connector 17. The connecting end of the pipe has the supplementary connector 17 properly so set in place as to cover the same, then has the connector properly fitted in place after subjecting the same to diameter build-up. Thereby the connecting force of the connecting section can be specially enhanced, and the connector produced by the application of the principle of the connection introduced in the present invention can be properly fitted in place for a thin metal film as well, thus resulting in definitely extending the scope of applicability of the connector introduced in the present invention. The material for the supplementary connector 17 include conventional ferrous metal, brass and the like, and hence is unlimited.

Figure 7:
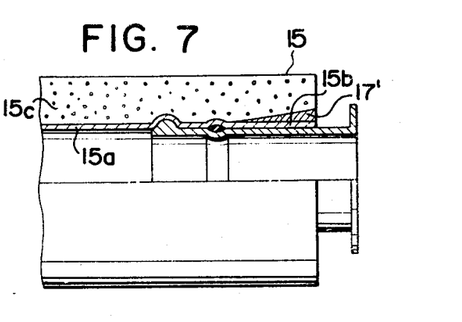
FIG. 7 is a section of another alternate embodiment showing the connector in the state of being fitted in place together with an auxiliary connecting device on the connecting end of a composite pipe.

Shown in FIG. 7 is another alternate embodiment showing a supplementary connector 17' specifically employed for the purpose of the connecting end 15b of the composite pipe 15 which has a covering layer 15c. The inner peripheral wall is the supplementary connector 17' and has a cylindrical surface, and the outer peripheral wall is properly tapered in such a manner as shown in the drawing, whereby secure fitting between the covering layer 15c and the pipe 15a can be ensured.

Figure 8A:
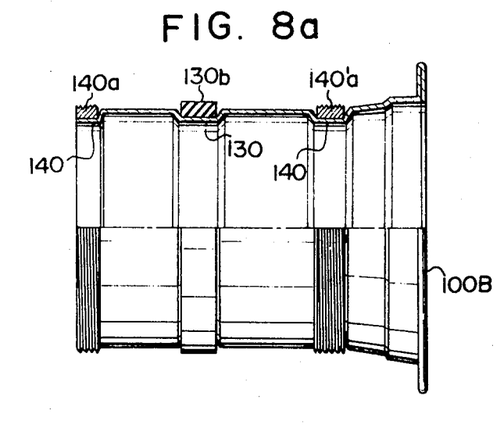
FIG. 8a is a section of a further alternate embodiment showing a connector in the state of being fitted in place on the internal peripheral wall of a cylinder at the connecting end of a pipe by subjecting the internal peripheral wall of a cylinder to ring-shaped diameter-extending plastic deformation at two places.
Figure 8B:
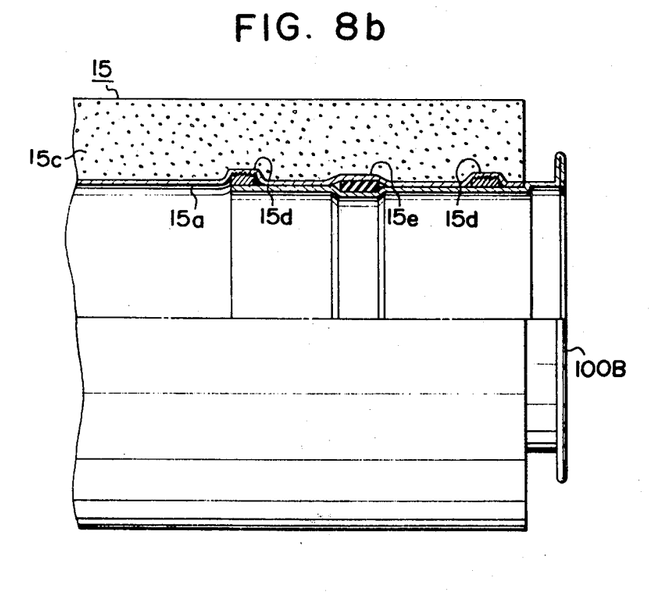
FIG. 8b is a section of FIG. 8b in the state of being properly fitted in place.

Shown in FIG. 8a is another alternate connector 100B which is provided with a couple of ejection rings 140a and 140'a. The groove 140 for receiving the ejection rings is formed at the top section A, and at such a position in the intermediate section B near the rear section C as well. A ring-shaped concave section 130 to set a packing member 130b is properly formed in the space between both rings. As depicted in FIG. 8b showing the state of being fitted, the sharp-angled ring-shaped plastic deformation 15d is formed in parallel to the double lead pipe 15a; therefore, even in case such external force as subjects the pipe connecting section to flexure should be applied on the connector 100B, bending moment hardly occurs, to thus display superb stability.

Figure 9:
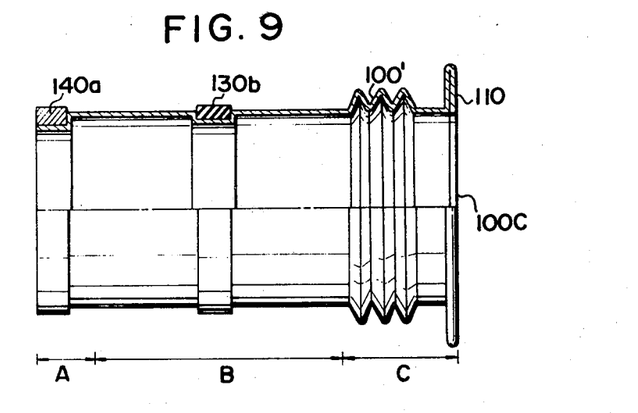
FIG. 9 is a section of a part of a modified connector capable of having an angle for the connection formed.

FIG. 9 shows another alternate embodiment wherein a connector 100C has bellows 100' properly formed in the rear section C, and the pipe connecting section is provided with degrees of freedom of the connecting position. This connector 100C has such other advantage that flexural connection can also. be conducted thereby, and, in case such external force as subjects the connecting section to flexure and deflection should be applied thereon, such is properly absorbed by the flexibility of the bellows 100', and the engaging force making use of sharp-angled plastic deformation is thus properly preserved.

The said primary ejection ring section 14 and the ejection ring 140a can be properly subjected to diameter build-up deformation under normal hydraulic pressure by the employment of the diameter build-up tool 16, even in case the primary ejection ring section and the ejection ring have a complete ring shape. Of those, the ejection ring 140a can be used as a split ring; however, in this case, the construction shown in FIG. 5a proves to be rather improper, except in the case of employing the packing member 130b infallibly for giving the connector a perfect sealing force. The width of the packing member can be increased readily enough for giving the required sealing force, whenever a specially large sealing force is required.

Shown in FIG. 10a through FIG. 10d are some examples of such a fixing device as join the flange 11 or 110 properly formed for the connector introduced in the present invention. The fitting-fixing tool 118 has a groove for setting a pair of flanges 11 (or 110) therein properly formed in the interior, and a pair of flanges are concurrently fitted in place in combination through the split opening. The packing member can be employed, wherever so required.

The fixing tools comprising the cap nut 111 and the nut 112 can likewise be properly combined optionally, prior to fitting the connector 10, 100, 100A, 100B, or 100C properly in place on the pipe connecting end, then can be fixed in place at liberty by way of the flange 11 or 110 of the connector.

Figure 10A:
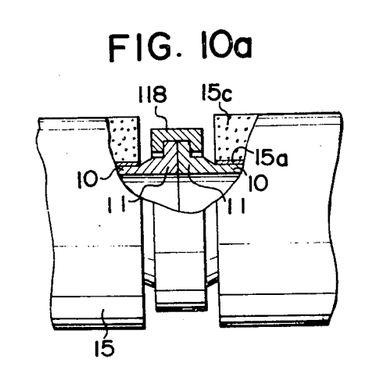
FIG. 10a through FIG. 10d are sections of the connector introduced in the present invention in the state of being employed in some illustrations for making connection of pipes with each other.
Figure 10B:
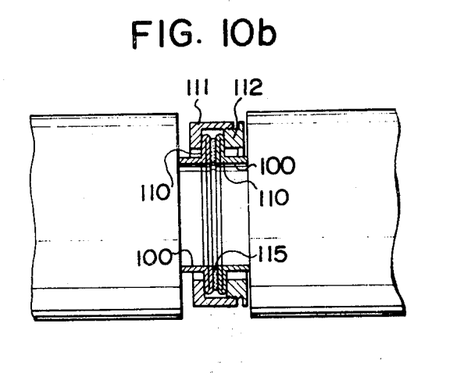
Figure 10C:
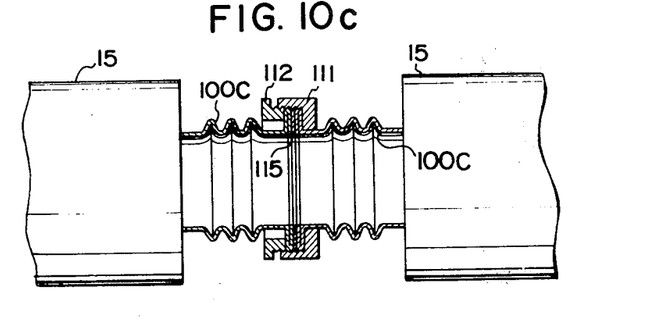
Figure 10D:
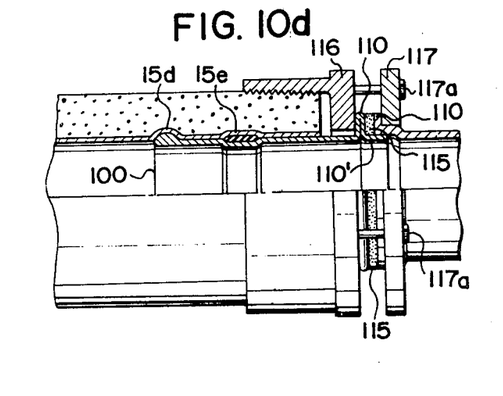
Figure 10E:
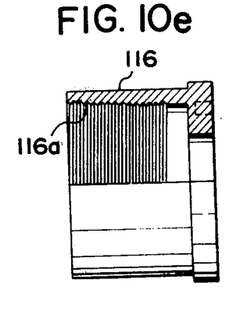
FIG. 10e is a partial section of the construction of a fixing device employed for the connector shown in FIG. 10d.

Shown in FIG. 10d is an example wherein fixing devices 116 and 117 of the flange joint type are employed. In case the fixing device 116 has such multiple threads 116a as are shown in FIG. 10e properly formed on the internal peripheral surface thereof, causing the external peripheral surface of the pipe connecting end to bite in between the said multiple threads at the time of the diameter build-up treatment of the connector 100 not only well serves the fixing device 116 to be properly held in place securely enough, but also for the improvement of the strength of the connecting end, in the same manner as in the case shown in FIG. 6 and FIG. 7. Shown in these drawings is also such a construction wherein a ring flange 110' is set in place outside the flange 110. In the case of fitting the ring flange 110' in place on an object member of connection, the flanges 11 or 110 to be thus jointed with each other are lapped in an accurate manner, and the jointed section is improved in strength at the same time. The fixing device 116 is tied with such other fixing device 117 as is supported by the counterpart flange 110 by the bolt 117a, thus forming secure connection.

In case the connector introduced in the present invention has a flange properly formed therefor, various types of fixing devices can be optionally combined, prior to fitting the same on the pipe connecting end, to thus facilitate the use of the fixing devices in an extensive manner, and this constitutes a meritorious feature quite foreign to any conventional connector.

The connector of such a type that has a convex thread added on the outer peripheral section 14a of the primary ejection ring section 14 or on the outer peripheral section of the ejection ring 140a is capable of causing this convex thread to bite into the inner peripheral wall of the pipe connecting end. Thereby the said convex thread is further caused to bite into the ring-shaped plastic deformation 15d, until the mechanical engagement force and the water-rightness of this section is further improved. Furthermore, it is desirable that such an ejection ring section, ring-shaped flange, ring-shaped groove as are to be subjected to diameter build-up; and the ring-shaped concave section for holding the packing member in place are so formed as to have the same inner diameter, and that the connector is subjected to diameter build-up, in correspondence to the use thereof, so that the diameter build-up treatment can be conducted by a single stage. In the case of designing such a connector as has the section for holding the packing kept free from being subjected to diameter build-up, the thickness of the packing employed is increased by the application of a proper means. The above-mentioned ring-shaped flange and groove for forming the connector are to be shaped by the application of a pressing process including constriction, and the connector as a whole is to be manufactured as a foundary product.

What is claimed is:

1. A connector for connecting the end of a pipe with another element comprising a cylindrical member having a first cylindrical section having a first radial ring means and a second cylindrical section having a second radial ring means, said first radial ring means being longitudinally spaced from said second radial ring means, said cylindrical member also having a third cylindrical section having a radial flange at the longitudinal end thereof, said first and second cylindrical sections along with at least a portion of said third cylindrical section being disposed with said pipe, a first circular protruding ring circumscribing said pipe, a second circular protruding ring circumscribing said pipe, said first radial ring means comprises a first circumscribing indentation in said first cylindrical section and an injection ring disposed in said first circumscribing indentation, said second radial ring means comprising a second circumscribing indentation in said second cylindrical section and a packing ring disposed in said second circumscribing indentation, said injection ring being at least partially disposed in abutting relationship with said first circular protruding ring circumscribing said pipe, said packing ring being at least partially disposed in abutting relationship with said second circular protruding ring circumscribing said pipe, said packing ring being disposed in sealing relationship with said second circular protruding ring, said first and second circular protruding rings on said pipe being formed in situ by plastic deformation upon expanding the diameter of said first and second radial ring means, whereby said cylindrical member is secured to said pipe in sealing relationship.

2. A connector according to claim 1 wherein said third cylindrical section has a first portion which abuts the inside of said pipe, said first portion of said third cylindrical section being expanded in diameter in situ, said third cylindrical section having a second portion which is larger in diameter than the inner diameter of said pipe, said second portion being disposed adjacent to the longitudinal end of said pipe.

3. A connector according to claim 1 including a covering layer such as insulation or the like on the outside of said pipe, said cylindrical member being installed in said pipe without impairing the integrity of said covering layer on the outside of said pipe.

4. A connector according to claim 3 including a cylindrical supplemental connector circumscribing said pipe between the latter and said covering layer, said supplemental connector at least partially circumscribing to said third cylindrical section of said cylindrical member.

5. A connector according to claim 1 wherein said third cylindrical section of said cylindrical member has a third circumscribing indentation, and a third ring disposed in said third circumscribing indentation, said third ring being at least partially disposed in abutting relationship in a third circular protruding ring circumscribing said pipe.

6. A connector according to claim 1 including bellow means on said third cylindrical section of said cylindrical member.

7. A connector according to claim 1 further comprising means for connecting said radial flange on said third cylindrical section of said cylindrical member to said other element in sealing relationship therewith.

* * * * *